United States Patent

[11] 3,632,204

| [72] | Inventor | Murray Friedel<br>North Miami Beach, Fla. |
|---|---|---|
| [21] | Appl. No. | 887,713 |
| [22] | Filed | Dec. 23, 1969 |
| [45] | Patented | Jan. 4, 1972 |
| [73] | Assignee | Visual Graphics Corporation<br>New York, N.Y. |

[54] PHOTOPRINTING AND PROCESSING DEVICE
8 Claims, 18 Drawing Figs.

[52] U.S. Cl.................................................. 355/27,
355/66, 355/70
[51] Int. Cl.................................................. G03b 27/32
[50] Field of Search............................................ 355/27, 66,
70

[56] References Cited
UNITED STATES PATENTS

| 3,040,640 | 6/1962 | Abel, Jr. et al................ | 355/27 X |
| 3,208,335 | 9/1965 | Doherty........................ | 355/27 |

Primary Examiner—Samuel S. Matthews
Assistant Examiner—Richard A. Wintercorn
Attorney—Albert F. Kronman ABSTRACT: A self-contained camera, photoprinting and processing machine in which the interior of the camera is accessible to the operator through a lighttight sleeve carried by a horizontally movable flat strip. Operations within the camera are visible through a light-filtering window which prevents ambient light from exposing the photographic paper or film within the camera. The copy holder is illuminated by swingable lamp holders and the lamps rocked to prevent hot spots on the copy. Vacuum means are used to hold the light-sensitive paper upon a platen while it is being positioned.

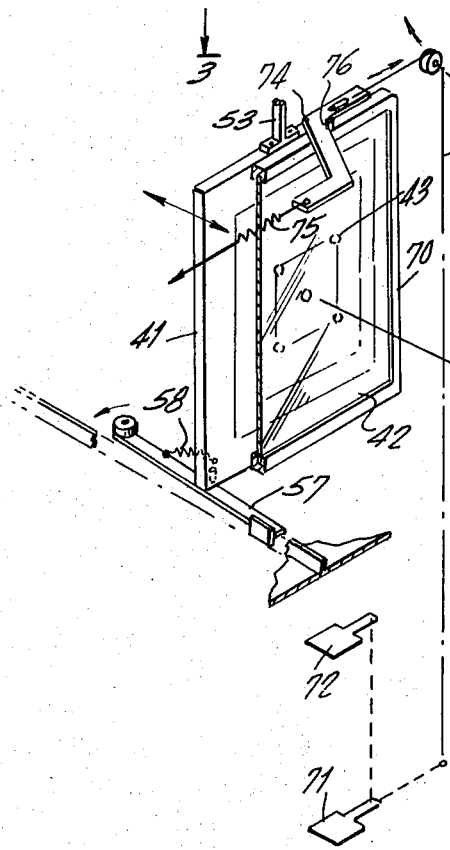
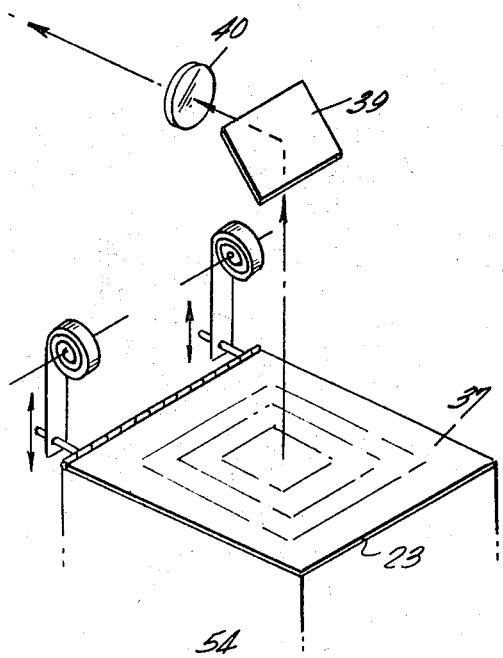
FIG. 2
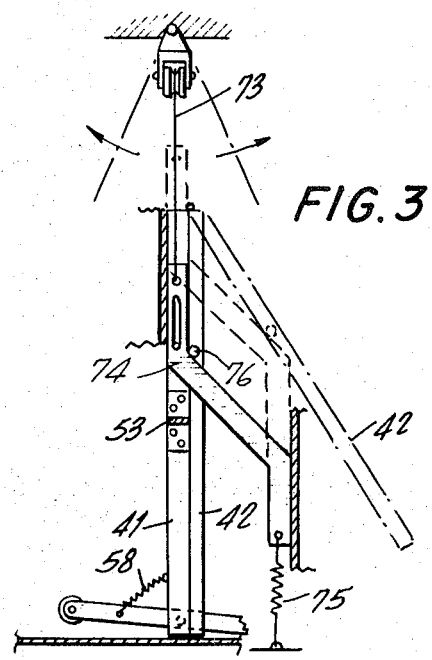
FIG. 3
FIG. 4
INVENTOR
MURRAY FRIEDEL
ATTORNEY

INVENTOR.
MURRAY FRIEDEL

ATTORNEY

INVENTOR.
MURRAY FRIEDEL
ATTORNEY

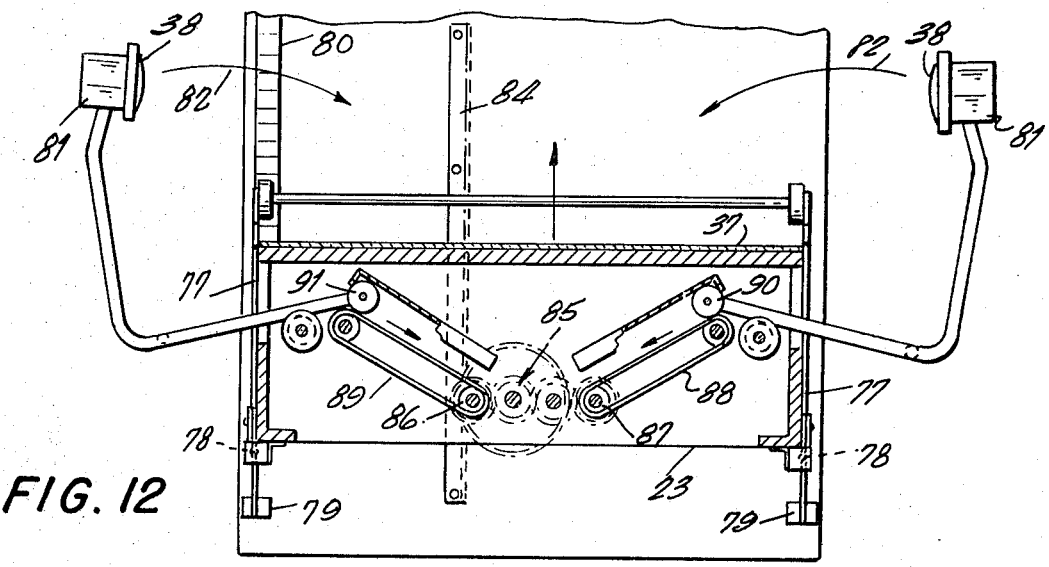
FIG. 12
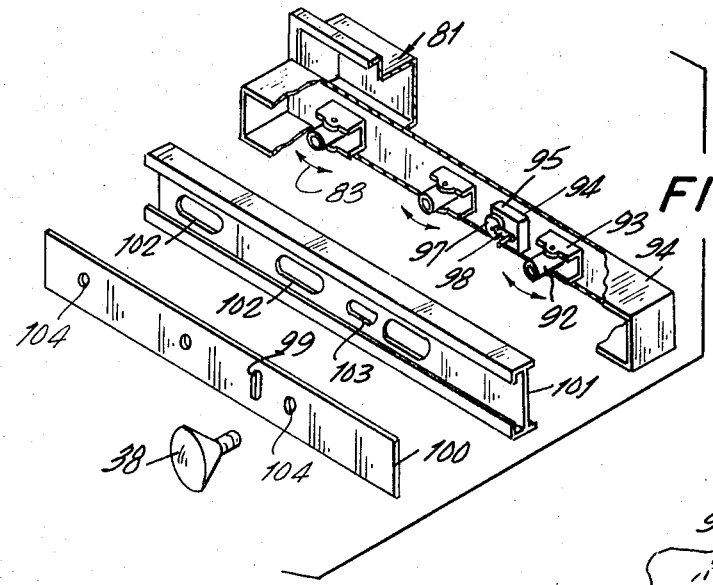
FIG. 13
FIG. 14
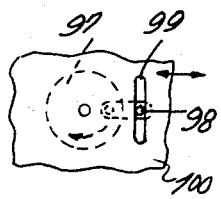
FIG. 15
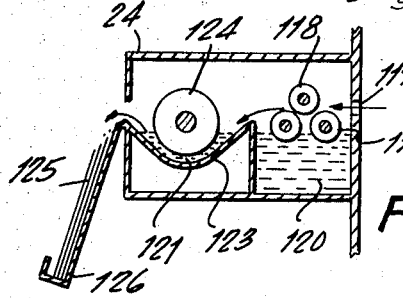
FIG. 16
INVENTOR.
MURRAY FRIEDEL
ATTORNEY

INVENTOR.
MURRAY FRIEDEL
ATTORNEY 3,632,204

PHOTOPRINTING AND PROCESSING DEVICE

BACKGROUND OF THE INVENTION

The production of photographic plates, copies, and prints, has commonly been carried out by means of a camera and a darkroom. Many of the steps of the processes were performed in the dark with consequent difficulties and mistakes. In addition, most darkrooms take up a substantial amount of space and require the isolation of the operator. In an earlier U.S. Pat. No. 3,291,020 issued Dec. 13, 1966, it was shown that the various steps of photoprinting and processing could be carried out within a self-contained camera, photoprinting and processing machine. However, the handling of the paper and the various apparatus necessary to carry out the operations required reaching into the machine with a specially prepared control arm and the use of swinging mirrors and lenses in order to carry out the operations.

The present invention provides a self-contained unit which is easier to operate, capable of a larger variety of applications, and eliminates many of the difficulties of prior art devices.

DESCRIPTION OF THE DRAWINGS

In the accompanying drawings, forming a part hereof corresponding parts have been given identical reference numerals and in which drawings:

FIG. 2 is a diagrammatic view of the photocomposing and exposure section of the device shown in FIG. 1.

FIG. 3 is a fragmentary view taken on line 3—3 in FIG. 2.

FIG. 4 is a somewhat isometric view of the paper support platen and guide somewhat enlarged.

FIG. 12 is sectional view taken on line 12—12 in FIG. 1.

FIG. 13 is an exploded view of a copy board light as used in the present invention.

FIG. 14 is a longitudinal fragmentary section of a copy board light.

FIG. 15 is a fragmentary view in front elevation of a copy board light control plate.

FIG. 16 is a cross-sectional view of the film processing portion of the present invention.

DESCRIPTION OF THE PREFERRED EMBODIMENT

As used herein, the term light-sensitive paper includes light-sensitive materials of every type, including film, foils, coated glass plats, etc.

The term camera is used herein to include any light receiving image focusing device for producing photocopies, photoprints, color transparencies, offset plates, etc.

Figure 1:
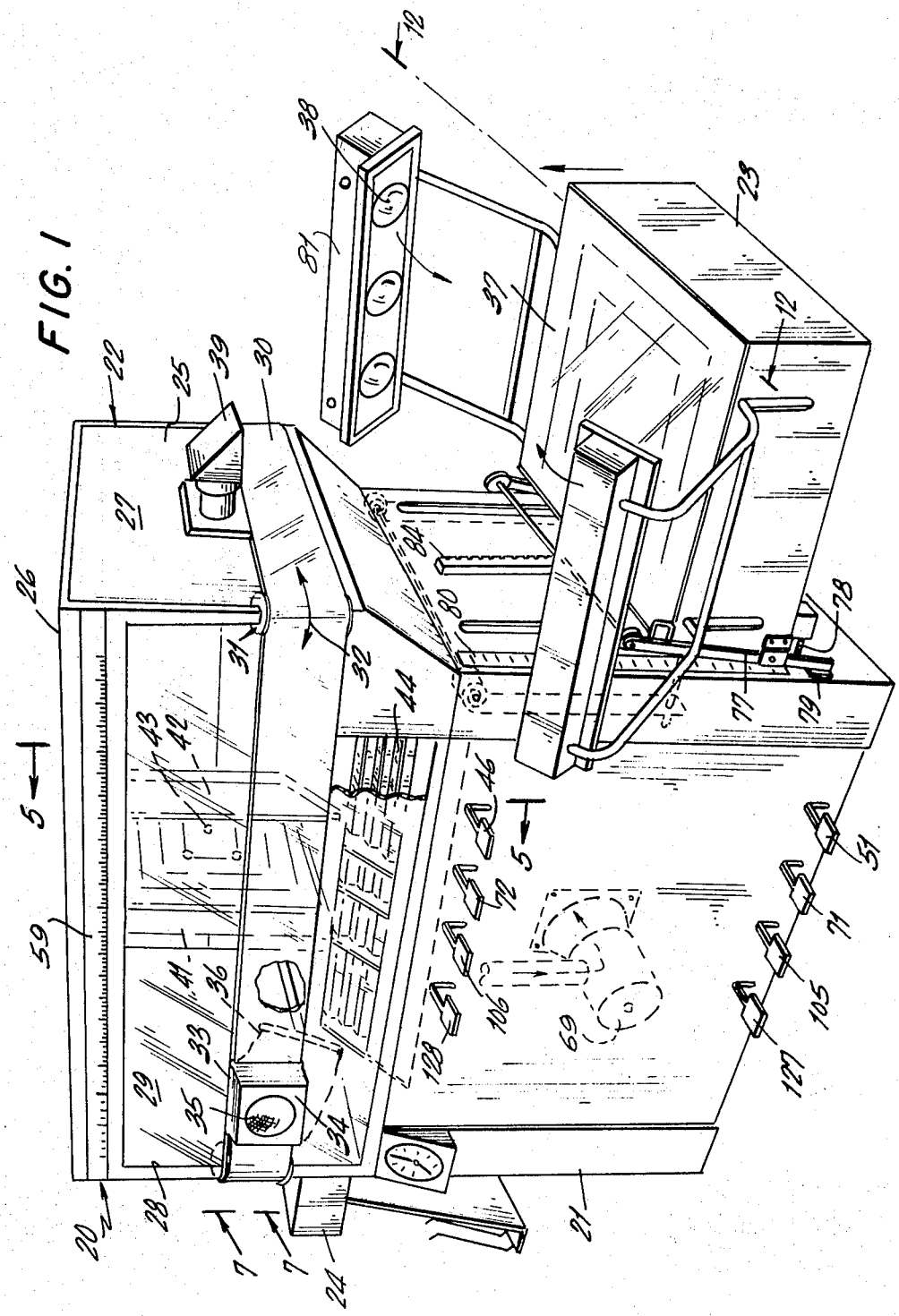
FIG. 1 is a somewhat isometric view of a complete embodiment of the present invention.

Referring to the drawings, and particularly to FIG. 1, 20 indicates a complete photocopying and photoprinting device made in accordance with the present invention. The device 20 broadly comprises a base 21 having a camera 22 on top thereof, a copy board 23 at one end thereof, and a processing station 24 at the opposite end.

The camera 22 comprises a substantially rectangular hollow housing 25 having an opaque top portion 26 and opaque side panels 27, 28. The control face of the housing 25 is provided with a window 29 made of some suitable light filtering material well known in the photographic art, such that ambient light will not expose light-sensitive paper within the housing 25, while at the same time, permitting the operator to observe what is happening within the camera. The window 29 may be made in two pieces as shown in FIG. 1 or may be provided with a transverse elongated opening therein. In any event, a space is provided in the window 29 which is overlain by a belt 30 made of some suitable opaque material. The belt is carried around the entire housing 25 and supported on rollers 31 so that it can be slid back and forth in a horizontal direction on the housing as indicated by the arrows 32.

A sleeve assembly 33 is carried upon the belt 30 and consists of a lightproof box 34 having a hand-receiving opening 35 therein. The opening 35 is provided with flaps (not shown) in the well-known manner, to permit the operator's hand to be thrust through the flaps without admitting light into the interior of the housing 25. An elongated flexible sleeve 36 is attached to the inside of the box 34 and further adds to the light proofing of the assembly. When the operator thrusts his hand through the sleeve assembly 33 he can operate the camera from the inside and move it about freely by reason of the action of the belt 30 and the flexible sleeve 36.

The material to be copied is placed beneath a transparent sheet 37 of glass or plastic carried upon the copy board 23. Lights 38 carried on each side of the copy board serve to illuminate the copy in the manner hereinafter more fully set forth.

The light reflected from the copy is picked up by a prism or mirror 39 which is carried by the side panel 27 of the housing 25 and which forms part of the lens assembly 40. The lens assembly 40 directs the light upon a platen 41 vertically mounted within the housing 25. The platen 41 is provided with a transparent rigid sheet 42 hingedly secured along one side thereof and adapted, when closed, to hold a sheet of light sensitive material against the platen 41. In addition, the platen 41, part of which is somewhat box shaped, is provided with a plurality of openings 43 (best shown in FIG. 2) which communicate with the interior of the platen to which a source of vacuum is attached. The purpose of the openings 43 and the vacuum source is to hold light-sensitive material against the platen during such time as it is being positioned thereon.

Figure 5:
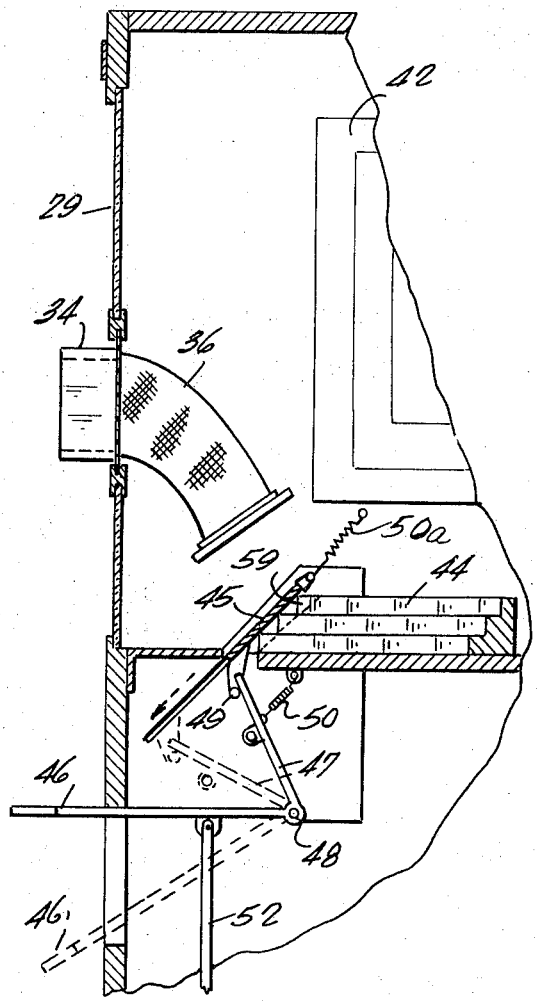
FIG. 5 is a vertical sectional view on an enlarged scale taken on line 5—5 of FIG. 1.
Figure 6:
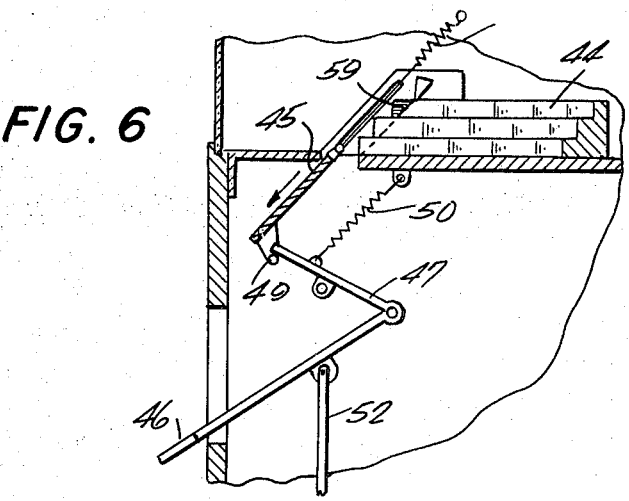
FIG. 6 is a fragmentary view of the paper safe shown in FIG. 5.
Figure 7:
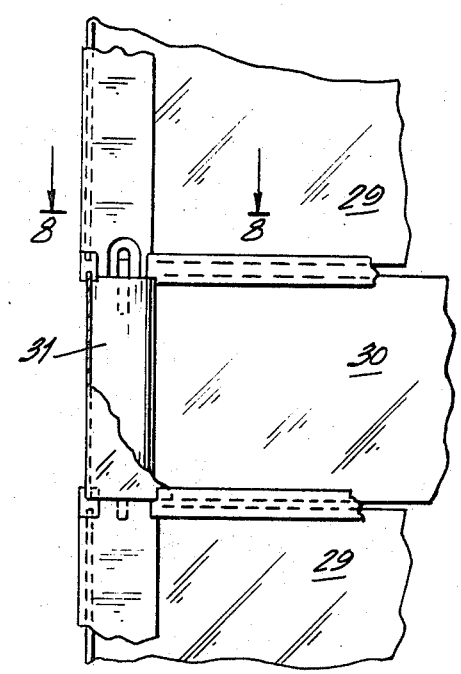
FIG. 7 is a fragmentary view taken on line 7—7 in FIG. 1.
Figure 8:
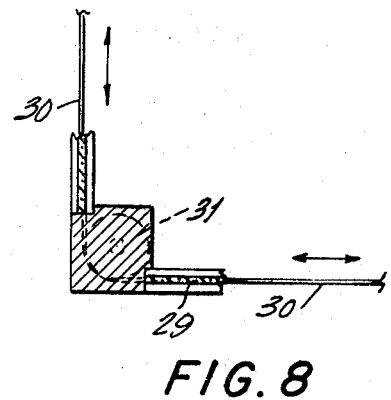
FIG. 8 is a view taken on line 8—8 in FIG. 7.

Beneath the platen 41 and facing the front of the photoprinting and processing device, there is located a paper safe 44. The paper safe which is accessible to the operator through the box 34 and sleeve 36 contains the various types of light-sensitive material which are employed from time to time in the operation of the photoprinting and processing device. As shown in FIG. 5, a sliding cover 45 is provided for the front of the paper safe 44, which cover can be actuated by means of an arm 46, which extends through the front of the base 21. The arm 46 is part of a bell crank lever 47, which in turn is pivotally secured within the base 21 as indicated at 48. The free end of the lever 47 bears against a depending bar 49 on the cover 45, which slides it away from the openings 59 in the front of the paper safe 44. Springs 50, 50a, attached to the lever 47 and the top of the cover 45 serve to return these members to a closed position when the arm 46 is released. Alternately, the paper safe cover 45 may be operated by means of a foot pedal 51 which projects through the base 21 immediately below the arm 46 and which is connected by means of a link 52 to the said arm. The open and close positions of the cover 45 are illustrated in FIGS. 5 and 6.

As shown somewhat diagrammatically in FIG. 2, the platen 41 and the copy board 23 are both adjustably mounted for the purpose of varying the size of the image projected upon the light-sensitive paper within the platen 41. As shown in FIG. 4, the platen 41 is suspended from a bracket 53 which is somewhat "Y"-shaped and provided with rollers 54, 55. The rollers 54, 55, ride upon spaced rail members 56, which in turn are secured to the housing 25. Once adjusted, the platen 41 is frictionally held in place by means of an elongated bar 57 which is carried beneath the platen and urged in the direction thereof by a spring 58 as shown in FIG. 2. When it is desired to adjust the platen 41, the bar 57 is pulled out of contact with the platen 41 by reaching through the sleeve assembly 33 and the platen is slid along the rails 56 until it lines up with the desired position on the scale 59 provided on the outside of the housing 25 just above the window 29. The bar 57 is then released and the spring 58 pulls it into contact with the platen 41.

Figure 9:
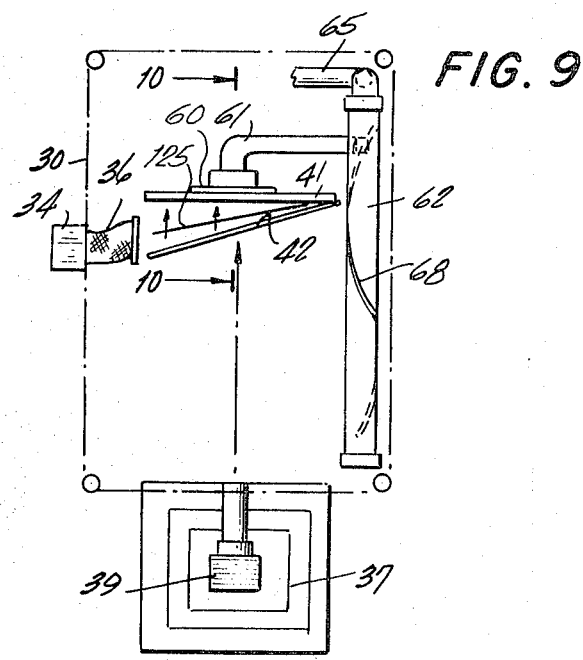
FIG. 9 is a somewhat diagrammatic plan view of the device shown in FIG. 1.
Figure 11:
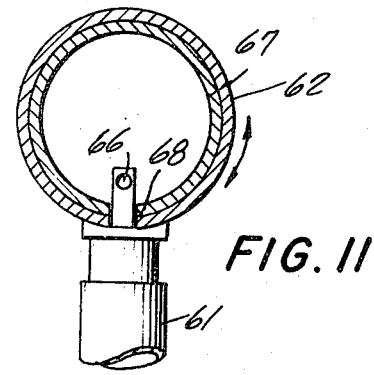
FIG. 11 is a sectional view taken on line 11—11 in FIG. 10.
Figure 10:
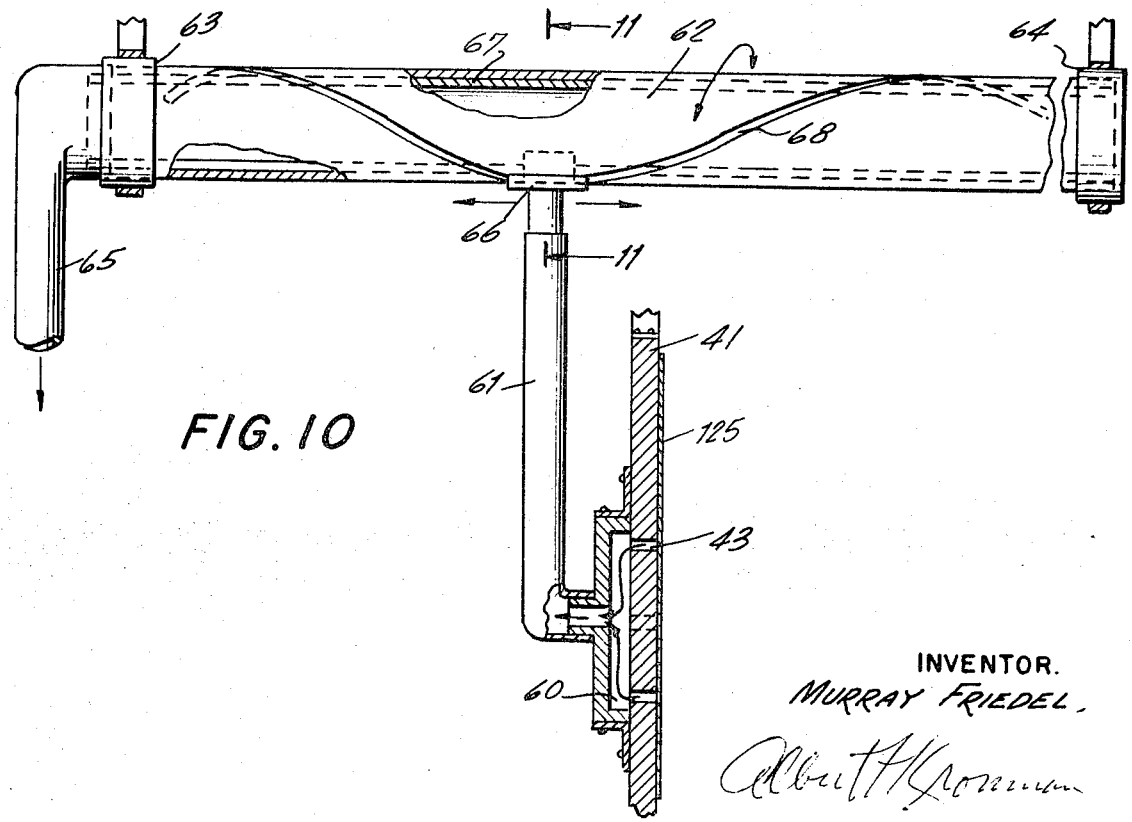
FIG. 10 is a fragmentary view somewhat enlarged of a platen vacuum system used in the present invention.

As shown in FIGS. 9, 10, and 11, the holes 43 in the platen 41 communicate with a small chamber 60. The chamber 60, in turn, is connected to a source of vacuum by means of a pipe 61 slidably connected to a header 62. The header 62 is rotatably supported at each end by bearings 63, 64, secured to the housing 25. A source of vacuum 69 (See FIG. 1) is connected to the header 62 by means of the line 65.

The pipe 61 is provided with a flanged coupling member 66, which communicates with the interior of the header 62 through a longitudinally slotted sleeve 67. The sleeve 67 is freely carried within the header 62 and the header is provided with a sinuous slot 68 within which the coupling 66 can travel. As the coupling 66 moves longitudinally of the header 62, in response to adjustment of the platen 41, the sleeve 67 serves to close all of the slot 68 while permitting the vacuum within the header to act on the chamber 60 behind the platen 41. In this manner, no matter where the platen 41 is placed there will be vacuum available at the holes 43 to hold a sheet of sensitized material to the platen 41 while it is being adjusted upon the platen and until the transparent sheet 42 is swung into place to cover the sensitized material.

The transparent sheet 42 is carried within a frame 70 as best shown in FIG. 2. The sheet 42 can be swung open or permitted to close by means of either the foot pedal 71 or the arm 72, which extend from the front of the base 21. The arm 72 and foot pedal 71 are linked together as indicated diagrammatically by the dashed lines in FIG. 2 to operate a cord 73 attached to one end of a Z-bar 74. The opposite end of the Z-bar is connected to a spring 75, which returns it to its original position when the foot pedal 71 or arm 72 are released. A pin 76 carried by the frame 70 bears against the edge of the Z-bar 74. The frame 70 is secured to the platen 41 by spring-loaded hinges (not shown) which urge the frame against the platen at all times. When the Z-bar 74 is pulled back by the operation of the cord 73, it forces the pin 76 away from the platen 41, thereby opening the frame and the transparent member 42.

As previously stated, a copy board 23, mounted on one side of the base 21, supports the copy to be photographed. The copy board 23 is counterbalanced by weights within the base 21 in the well-known manner. Positioning arms 77 (best shown in FIG. 1) are pivotally mounted at each side of the copy board 23. Springs 78 are provided to urge the positioning arms against the side of the base 21 at all times. When it is desired to adjust the copy board 23, it is merely necessary to move the positioning arms 77 in the direction of the base 21 and raise or lower the entire assembly to the required position. Releasing the positioning arms will bring friction pads 79, attached to the bottom of the positioning arms, to bear against the side of the base and hold the copy board in position. A scale 80 is provided on the base 21 adjacent the copy board 23 for rapid orientation.

The copy upon the copy board is illuminated by means of lamps 38 mounted on each side of the copy board. The lamps 38 are carried within lamp holders 81, (best shown in FIG. 12 thru 15). The lamp holders 81 both swing the lamp in the direction indicated by the arrows 82 in FIG. 12 and oscillate them as indicated by the arrows 83 in FIG. 14 for the purpose of providing uniform and adequate lighting at all times. A gear rack 84 is attached to the side of the base 21 adjacent to copy board 23. The gear rack 84 is coupled to a gear train 85, which in turn drives pulleys 86, 87, within the copy board 23. As the copy board is raised or lowered, the motion imparted by the gear rack 84 to the gear train 85, causes the pulleys 86, 87, to turn belts 88, 89, which in turn drive the ends 90, 91, of the lamp holders 81 toward and away from the center of the copy board thereby changing the position of the lamp holders so as to bring them closer to or further away from the center of the copy board. In this manner, when the copy board is in its upper position requiring less light, the lamp holders will be in the extreme outboard position. When the copy board is furthest away from the prism 39, requiring most light, the lamp holders 81 will be swung in closest to the copy board.

In order to prevent hot spots caused by the lamp directed at the copy board, it has been found possible to oscillate the lamps 83 so as to sweep the copy during the exposure. The sweeping motion is accomplished by means of the structure shown in FIGS. 13, 14, and 15. It will be seen from an examination of these figures, that the lamps 38 are carried within sockets 92, which are swingably mounted in brackets 93 attached to the lamp holder housing 94. An actuator 95 consisting of a small motor 96 having a cam 97 secured to the output shaft thereof is also attached to the housing 94 as shown in FIG. 13. The cam 97 is provided with an outwardly extending arm 98, which engages a slot 99 in a slidable plate 100. The plate 100 is slidably carried by an elongated bracket 101 having openings 102, 103, therein to receive the lamps 38 and the arm 98 respectively therethrough. Holes 104 in the plate 100 permit the lamps 38 to be slipped through the plate 100 and into the sockets 92. It will be apparent that when the motor 96 is started, the arm 98 will oscillate the plate 100 causing the lamps 38 to swing back and forth and sweep the area of the copy board during exposure.

The lamps 38 and the motor 96 are energized by electrical means well known in the art and controlled by foot pedal 105 and arm 106 on the front of the camera.

Figure 18:
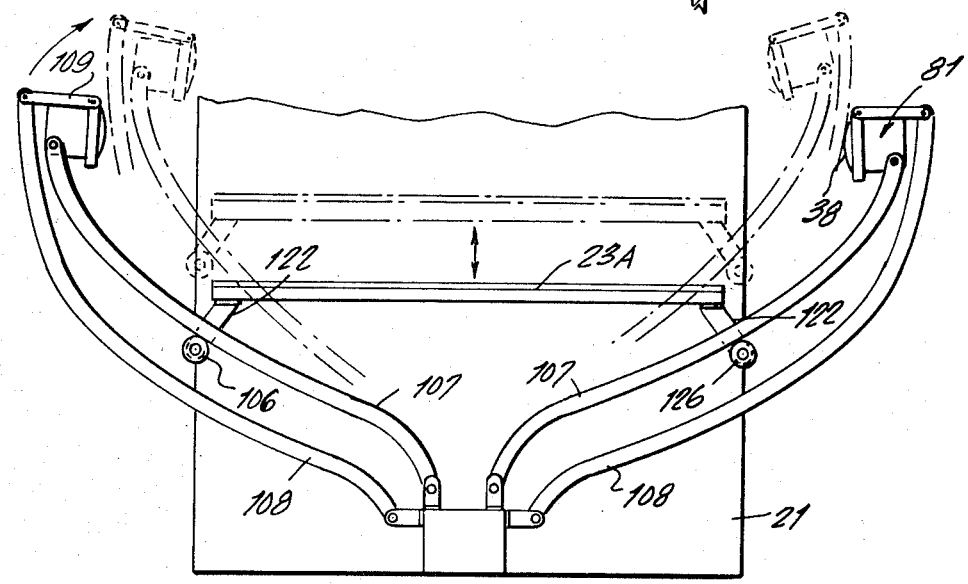
FIG. 18 is a fragmentary view in front elevation showing an alternate form of copy board light control.

FIG. 18 illustrates somewhat diagrammatically an alternate form of lamp adjusting means useful in the present invention. In this embodiment, the copy board 23a is provided with outwardly extending arms 122 at each side thereof, which arms terminate in rollers 106. The rollers 106 ride on elongated curved links 107, 108, as the copy board 23 is raised or lowered. It will be seen that links 107 are shorter than links 108 and are attached freely to the bottom of the lamp holders 81. Links 108 are secured to a short bar 109 extending outwardly from the tops of the lamp holders 81. By reason of the different lengths of the links 107, 108, as the copy board 23a is raised, the lamps 38 will be moved inwardly and directed down toward the copy board. The lamps will also be above the copy board a greater distance than when the copy board is lowered at which point the lamps will be closer to the plane of the copy board and directed more parallel to it. In this manner constant illumination is provided for the copy depending upon the distance of the copy board from the camera lens.

Figure 17:
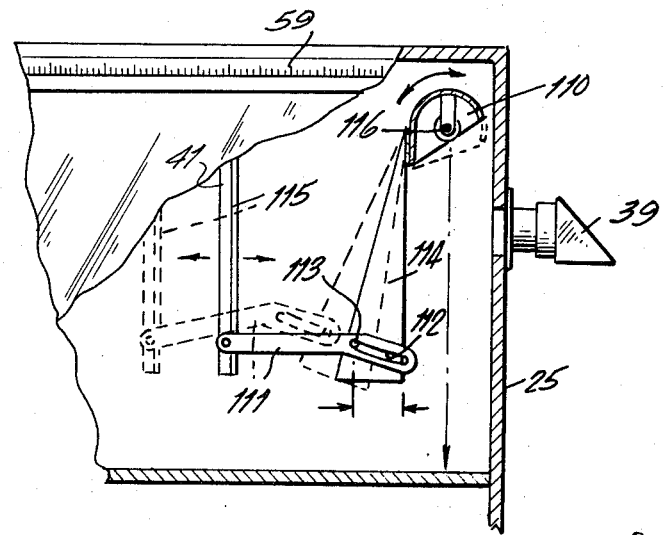
FIG. 17 is a fragmentary view in side elevation partly broken away of the camera section of the invention.

As shown in FIG. 17, a small lamp 110 is provided within the camera housing to illuminate the area where the operator's hands will be working. The lamp 110 is a "safe light" but is under the control of a linkage 111 which keeps it directed vertically when the platen 41 is closest to the lamp 110. The linkage 111 terminates in an elongated slotted portion 112 into which a pin 113 projects. The pin 113 extends outwardly of a control arm 114 attached to the lamp 110. The opposite end of the linkage 111 is secured to a vertical bar 115 which in turn is coupled to the platen 41. As the platen is moved away from the lens 40, the pin 113 slides within the slot 112 and the control arm 114 remains stationary. When the pin 113 reaches the end of the slot 112, the linkage 111 swings the control arm 114 causing the lamp 110 to rotate about its pivot point 116 to illuminate an area closer to the platen 41. As the platen is moved forward this procedure is reversed.

FIG. 16 illustrates somewhat diagrammatically a developing section suitable for use in the present invention. After the photosensitive material 125 has been exposed the operator removes it from the platen 41 and feeds it through the slot 117 in the developing section 24. The photosensitive sheet 125 is led into the nip of the rollers 118, 119. The rollers 119 are in communication with developing solution 120 and apply the solution to the photosensitive face of the record material. The record material is then fed into the stop solution 121 carried in a second reservoir 123 within which a roller 124 rotates. The roller 124 leads the record sheet 125 out of the developing section 124 and deposits it in a collector 126. Power to the developing section 124 is controlled by means of the foot pedal 127 or the arm 128 located on the front of the base 21 as shown in FIG. 1.

From the foregoing it will be apparent that in order to operate the photoprinting and processing device disclosed herein, the operator places the material to be copied upon the platen 23 beneath the transparent sheet 37 and orients it. The paper safe is next opened by stepping on the pedal 51 or pressing down on the arm 46. The operator then reaches into the safe 44 through the sleeve assembly 33 and withdraws a sheet of sensitized material. The transparent sheet 42 on the platen 41 is next opened by depressing the foot pedal 71 or the arm 72. The sheet of sensitized material is then placed upon the platen 41 over the holes 43 whereupon it will be held in place by the vacuum in the chamber immediately behind the holes 43. The sensitized sheet can be adjusted upon the platen 41 to the desired position and the transparent sheet released to cover it by releasing the foot pedal 71 or arm 72. Next the platen 41 and copy board 23 are adjusted with respect to height and position within the camera 22 until the proper size is arrived at. The lamps 38 are then turned on by means of the foot pedal 105 and the exposure made. Following the exposure, the sensitized sheet is removed from the platen 41 and fed into the developing section 124 from which it emerges as a copy.

From the foregoing it will be seen that there has been provided a self-contained photoprinting and processing device, which may be operated in a lighted room and which is capable of a wide variety of photoprinting operations and steps.

Having thus fully described the invention, what is claimed as new and desired to be secured by Letters Patents of the United States, is:

1. A combined photoprinting and processing device comprising a base, a camera housing on top of said base, a copy board adjustably carried at one side of said base, a photographic processor carried on the opposite side of said base, means to illuminate the copy board, means to receive the light coming from the copy board and direct it into the camera housing, a longitudinally movable platen within the camera housing to receive the light directed into the housing, means to hold a sheet of light-sensitive record material on said platen, a light-filtering window on the camera housing to screen out light to which the record material is sensitive, an elongated longitudinally movable belt in the form of a continuous band supported by rollers carried by the camera housing and overlying a portion of the window, lighttight access means carried by the belt whereby the operator may reach within the camera housing and means accessible to the front of the base to carry out the photoprinting and processing operations.

2. A device according to claim 1 in which the copy board is vertically adjustable and the illuminating means comprises lamps mounted in lamp holders and supported by elongated outwardly extending brackets responsive to the vertical adjustment of the copy board.

3. A device according to claim 2 in which the lamps are swingably mounted in the lamp holders and a motor driven cam is coupled to said lamp mounts to oscillate the lamps during the operation of the camera.

4. A device according to claim 2 in which the base is provided with a gear rack, a gear train is in mesh with the gear rack and belt means within the copy board and driven by the gear train change the position of the lamp holders as the copy board is moved vertically.

5. A device according to claim 2 in which the brackets are in the form of spaced links of unequal length, the shorter links being coupled at one end to the lower portion of the lamp holders and the longer links being coupled to the top portion of the lamp holders, said links being driven by outwardly extending arms carried by the copy board and being pivotally secured at their opposite ends to the base.

6. A device according to claim 1 in which the platen sheet holding means includes a source of vacuum, a plurality of holes in the platen in communication with the vacuum source and a transparent plate swingably carried by the platen and overlying the sheet receiving face thereof.

7. A device according to claim 6 in which the vacuum source is applied to the platen through a rotatably mounted header, said header having a sinuous slot in the wall thereof and a longitudinally slit sleeve within the header, a coupling slidably received within the sinuous slot and longitudinal slit and a pipe interconnecting the coupling and platen holes whereby vacuum is applied to the platen during all platen positions.

8. A device according to claim 6 in which the transparent plate is responsive to the longitudinal motion of a "Z"-bar driven by actuating means extending outwardly of the front of the base.

* * * * *